(12) United States Patent
Batchelor et al.

(10) Patent No.: US 7,103,690 B2
(45) Date of Patent: Sep. 5, 2006

(54) COMMUNICATION BETWEEN LOGICAL MACROS

(75) Inventors: Gary W. Batchelor, Tucson, AZ (US);
Brian J. Cagno, Tucson, AZ (US);
Renee S. LaMar, Tucson, AZ (US);
Michael L. Harper, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 10/958,967

(22) Filed: Oct. 5, 2004

(65) Prior Publication Data

US 2006/0075178 A1    Apr. 6, 2006

(51) Int. Cl.
*G06F 13/36* (2006.01)
*G11C 8/00* (2006.01)

(52) U.S. Cl. ................ 710/113; 710/309; 711/203; 370/916

(58) Field of Classification Search ............... 710/113, 710/309, 305, 100, 51; 365/230.02; 718/100, 718/103; 716/16; 711/203; 709/238–240, 709/253; 712/220; 370/419, 916, 462, 351, 370/431
See application file for complete search history.

(56) References Cited

U.S. PATENT DOCUMENTS

| | | | |
|---|---|---|---|
| 4,974,153 A | 11/1990 | Pimm et al. | |
| 5,119,314 A * | 6/1992 | Hotta et al. | 716/6 |
| 5,522,088 A * | 5/1996 | Halma et al. | 710/61 |
| 5,568,526 A * | 10/1996 | Ferraiolo et al. | 375/256 |
| 5,694,612 A * | 12/1997 | Garmire et al. | 712/11 |
| 5,761,078 A * | 6/1998 | Fuller et al. | 716/16 |
| 5,909,559 A | 6/1999 | So | |
| 6,192,482 B1 * | 2/2001 | Casper et al. | 713/503 |
| 6,633,994 B1 | 10/2003 | Hofmann et al. | |
| 7,051,307 B1 * | 5/2006 | Ditlow et al. | 716/7 |
| 2005/0223382 A1 * | 10/2005 | Lippett | 718/103 |
| 2006/0075178 A1 * | 4/2006 | Batchelor et al. | 710/309 |

OTHER PUBLICATIONS

"Logical macrocells of mobile multimedia metropolitan area network" by Lambertsen et al. (abstract only) Publication Date: Sep. 7-19, 2003.*

* cited by examiner

*Primary Examiner*—Gopal C. Ray
(74) *Attorney, Agent, or Firm*—Quarles & Brady Streich Lang LLP

(57) ABSTRACT

A connection is provided between logical macros to allow prioritization of operations in accordance with an arbitration scheme that distinguishes between operations based on such factors as priority or size of transaction. The invention allows connection of logical macros and prioritizes the appropriate operation for the resources available to optimize data throughput to optimize the utilization of multiple buses. A first arbiter manages data transmissions over a first communication bus. Arriving short or high-priority messages are transmitted over a second communication bus managed by a second arbiter, but only if the target logical macro is not the same as currently targeted by the first arbiter.

15 Claims, 4 Drawing Sheets

COMMUNICATION BETWEEN LOGICAL MACROS

BACKGROUND OF THE INVENTION

1. Field of the Invention

This invention is related in general to data communications systems. In particular, the invention consists of a system for transmitting data from multiple-source logical macros to multiple-target logical macros utilizing a plurality of data buses.

2. Description of the Prior Art

Transmitting data between logical macros can be problematic as multiple-source logical macros may contend for available bandwidth. Traditionally, communication between logical macros occurs via point-to-point networks over through buses. In a bus-oriented communication system, only one source device may communicate with one target device at any given time. Various resource allocation algorithms have been employed to manage competition for the data bus, such as the banker's algorithm or the round-robin schema. In a round-robin environment, each requesting device is given a turn at communicating over the bus, regardless of the length or importance of the communication. Bottlenecks occur if short or high-priority messages get queued behind large and time-consuming transmissions.

In U.S. Pat. No. 6,633,994, Hofman et al. disclose a system and method for optimizing data transfers between devices interconnected by buses operating at different clocking speeds. Hofman discloses taking advantage of unused clock cycles by differentiating between devices operating at different clock speeds. However, additional hardware is required to detect the clock speed ratio and, if a difference is detected, a cycle control detection circuit is used to transmit data to high speed and low speed devices on separate buses. It would be advantageous, however, to have a system for improving data transmission performance without utilizing different clock frequencies.

In U.S. Pat. No. 5,909,559, So et al. disclose a technique for processor optimization utilizing unused instructions. So's approach includes dynamic balancing of computational resources, analyzing the scalability of system resources, reallocation of peripheral functions, modularization of resources, and performance modification by varying the available processor instructions. Additional hardware is required, including a digital-signal processor, to increase communication performance. Virtual service processors are utilized in a dynamic architecture to overcome bus latency issues by buffering data during busy cycles and transmitting data when the bus becomes available. This is accomplished by utilizing the virtual service processors to convert software tasks into threads and sub-tasks and implementing preemptive multi-tasking, allowing one task to be preempted to allow execution of another of higher priority. It would be advantageous, however, to improve data transmission without extensive preprocessing and reorganization of data.

In U.S. Pat. No. 4,974,153, Pimm et al. disclose a repeater interlock scheme for transactions between two buses including transaction and interlock buffers to prevent deadlock conditions. However, only one interlock read transaction may be transmitted to memory. If a second interlock read command is received, the memory returns a busy confirmation. This busy confirmation cannot be cleared until an unlock memory write signal is received. A deadlock occurs because the unlock memory write signal will not be detected until the second interlock read command is processed. Conversely, the second interlock read command cannot be processed until the unlock memory write clears the memory lock. Therefore, the unlock memory write is stuck behind the interlock read command. This problem is solved by using an interlock state bit and an interlock buffer residing in the repeater hardware. It would be advantageous to solve this problem, however, independent of system architecture and macros connected to the bus controller.

SUMMARY OF THE INVENTION

The invention disclosed herein utilizes a bus controller including a multiplexor ("MUX"), a plurality of arbiters, a like number of communication buses, and a bus-controller interface to manage communication between logical macros. A first communication bus handles normal data flow between source logical macros and target logical macros. The first data bus is managed by a first arbiter using a round-robin resource allocation algorithm.

If a short message or high-priority message arrives at the bus controller and the first communication bus is currently tasked with prior-scheduled transactions, the newly arrived short or high-priority message is transmitted over a second communication bus. Messages transmitted over the second communication bus are managed by a second arbiter. However, the second arbiter is prevented from transmitting a message to a target logical macro that is receiving a message over the first communication bus.

Because two communication buses may connect source logical macros to a particular target logical macro, a bus-control interface including a second multiplexor determines which communication bus is allowed to transmit information to the target logical macro. Additionally, the bus-control interface includes an address incrementer to manage the internal address of the target logical macro to which the arriving message is written. A device-busy signal from the target logical macro to the first and second arbiters prevents them from allowing additional messages to be transmitted over the communication buses.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of utilizing a plurality of communication buses and associated arbiters to manage communications between logical macros, allowing short or high-priority messages to be quickly delivered even if the first communication bus is busy. The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
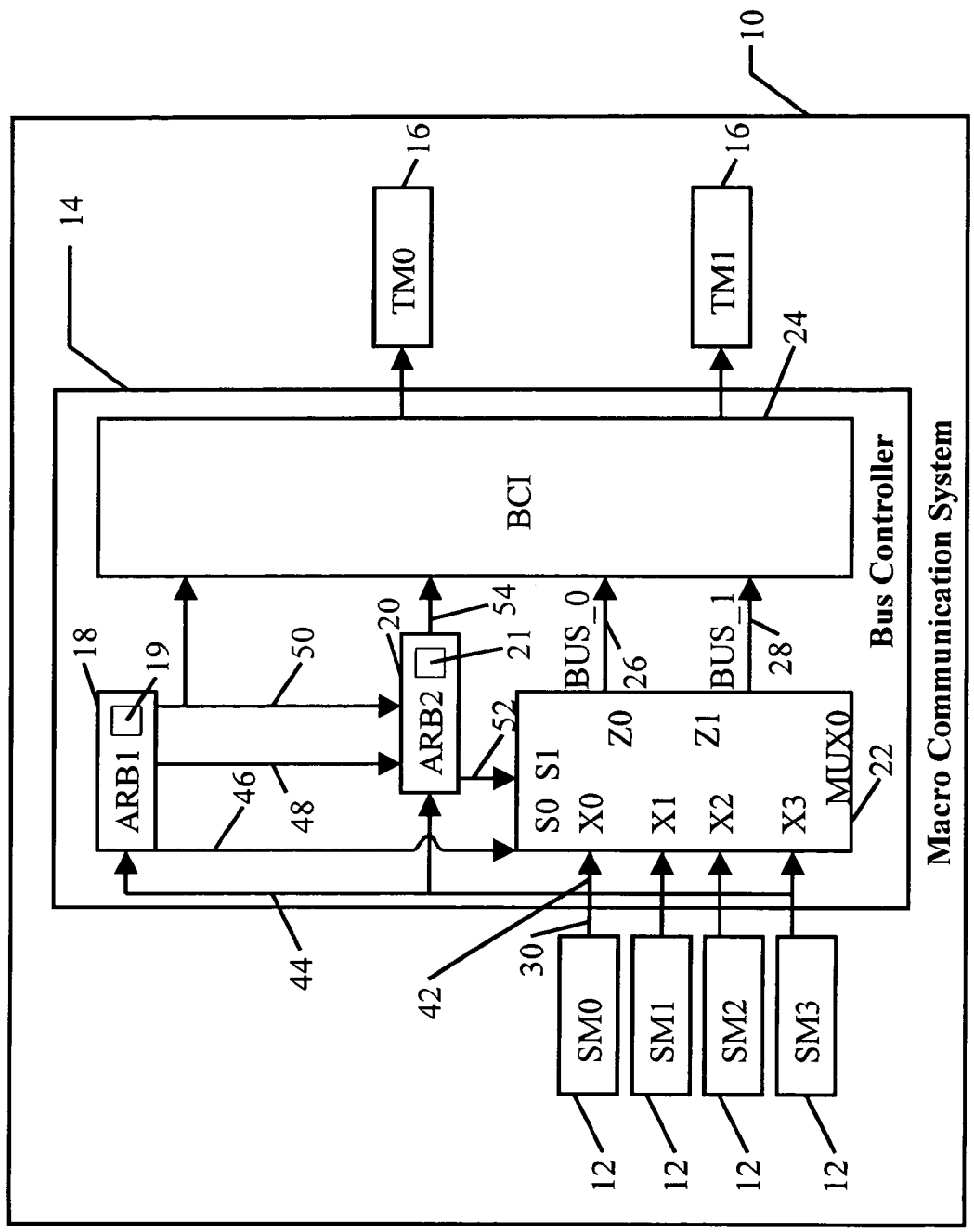
FIG. 1 is a block diagram illustrating a bus controller including a bus-control interface, a multiplexor, a plurality of communication buses, and a plurality of associated arbiters.

Referring to figures, wherein like parts are designated with the same reference numerals and symbols, FIG. 1 is a block diagram of a macro communication system 10 including source logical macros 12, a bus controller 14, and one or more target logical macros 16. The bus controller 14 includes a first arbiter 18, a second arbiter 20, a first multiplexor ("MUX") 22, a bus-control interface 24, a first communication bus 26, and a second communication bus 28.

Figure 2A:
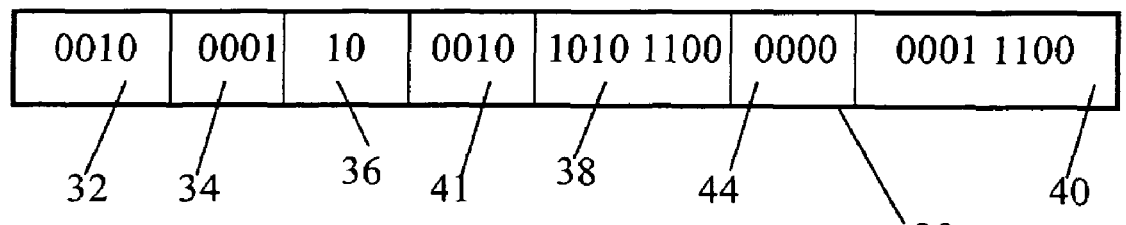
FIG. 2A is a block diagram illustrating an exemplary communication arriving from a source logical macro according to the invention.

Exemplary messages 30 arriving at the bus controller 14 are illustrated in FIG. 2A. Unless each arbiter 18,20 includes a separate input associated with each source logical macro 12, a source address field 32 may be used to identify the source logical macro 12 that transmitted the message. An operation field 41 may be used to indicate what the source logical macro 12 would like to do, i.e., read, write, return data. A target address field 34 may be used to identify the target logical macro 16 that is the destination of the message 30. A priority field 36 indicates the importance level of the associated message 30. The message also includes a data field 38, count field 44 that identifies the number of bytes to be read or written and an optional internal address field 40 that identifies the location within the target logical macro 16 where the data 38 is to be written.

Figure 2B:
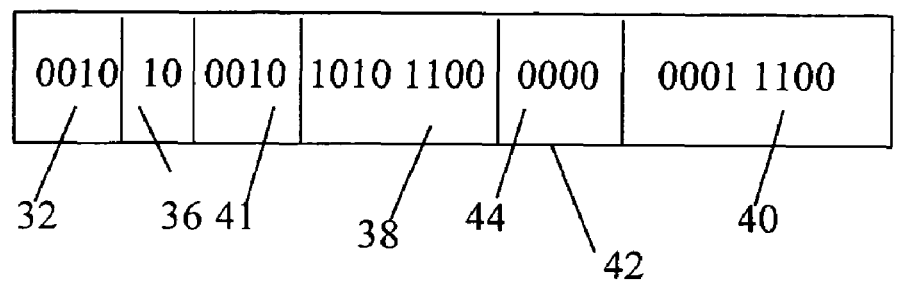
FIG. 2B is a block diagram illustrating data and internal logical macro address components of the exemplary communication of FIG. 2A.
Figure 2C:
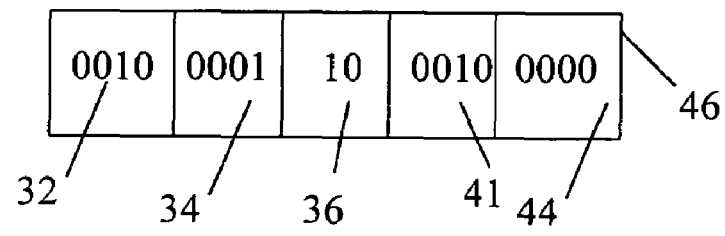
FIG. 2C is a block diagram illustrating a source logical-macro-address, a target logical-macro-address, and a priority level component of the exemplary communication of FIG. 2A.

Source address field 32, priority field 36, operation field 41, data field 38, count field 44 and internal logical macro addresses 40 are stripped from the message 30 and the resulting combined information 42 (FIG. 2B) is passed to the MUX 22. The combination of source address field 32, priority field 36, operation field 41, count field 44 and target address field 34 are combined into a second information message 46 (FIG. 2C) is passed to the first and second arbiters 18,20. In this embodiment of the invention, the first arbiter 18 utilizes a round-robin resource allocation algorithm 19 to manage communication traffic over the first communication bus 26. In this manner, each requesting source logical macro 12 takes a turn at transmitting a message over the communication bus 26. Once the first arbiter 18 determines which source logical macro is allowed to transmit over the first communication bus 26, a first select signal 46 is transmitted to the MUX 22 and a bus busy signal 48 is sent to the second arbiter 20, where another resource allocation algorithm 21 resides. Additionally, a target logical macro address 50 is sent to the bus-control interface 24 and the second arbiter 20. The first select signal 26 is used by the MUX to create a communication channel between the appropriate source logical macro 12 and the first communication bus 26. The associated combined information signal 42 is then passed to the bus-control interface 24.

If a message 30 arrives that is either short, optionally using the count field 44 to determine transfer size, or high-priority while the first communication bus 26 is busy, it is handled by the second arbiter utilizing another round-robin algorithm to place the short/high-priority message on the second communication bus. An aspect of the round-robin algorithm employed by the second arbiter 20 is that the target logical macro 16 cannot be the same target logical macro 16 being written to by the first communication bus 26. A second select signal 52 determines which source logical macro 12 is connected to the second communication bus 28 and an associated target logical macro address 54 is passed to the bus-control interface 24.

Figure 3:
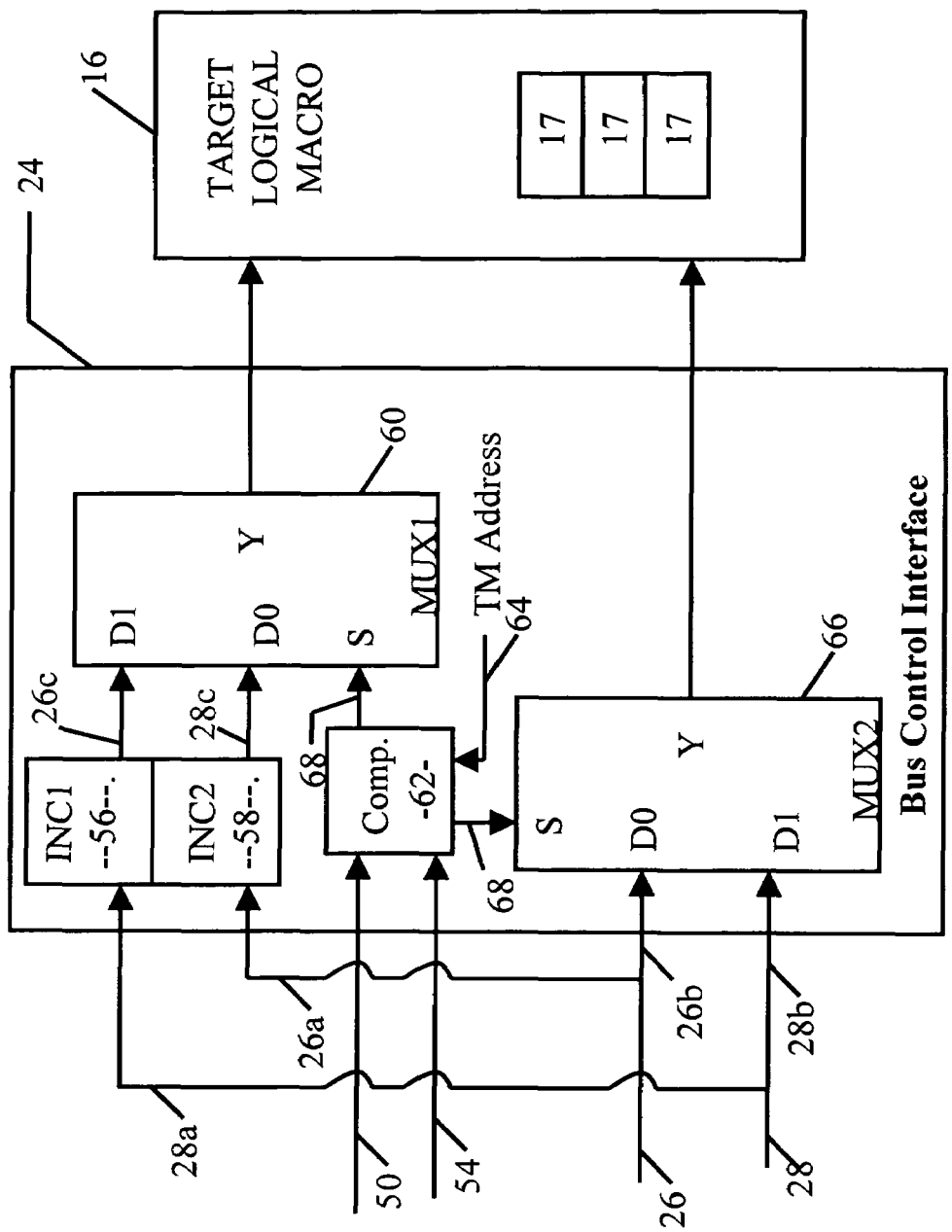
FIG. 3 is a block diagram illustrating the bus-control interface of FIG. 1 including a comparator and a plurality of multiplexors.

The block diagram of FIG. 3 illustrates one embodiment of a bus-control interface 24. Internal logical macro address signals 26a,28a are passed though address incrementers 56,58 and the incremented addresses 26c,28c are passed to a second MUX 60. A comparator 62 compares a static target address 64 associated with a particular target logical macro 16 to the first target logical macro address 50 and the second target logical macro address 54.

In this embodiment of the invention, if the static target address 64 matches the first target logical macro address 50, then a logic low is transmitted to the second MUX 60 and the third MUX 66 over the select line 68, allowing a first data signal 26b and first incremented address 26c to be transmitted to the associated target logical macro 16. The first incremented address 26c is used to identify which of a plurality of memory location 17 within the target logical macro 16 data is to be written.

If the static target address 64 matches the second target logical macro address 54, then a logic high is transmitted to the second MUX 60 and the third MUX 66 over the select line 68, allowing the second data signal 28b and second incremented address 28c to be transmitted to the associated target logical macro 16. If the static target address 64 does not match either the first target logical macro address 50 or the second target logical macro address 54, then the select line is placed in a high-impedance state and the outputs of the second MUX 60 and the third MUX 66 are placed in a high-impedance state to prevent accidental writing of information to the target logical macro 16.

Figure 4:
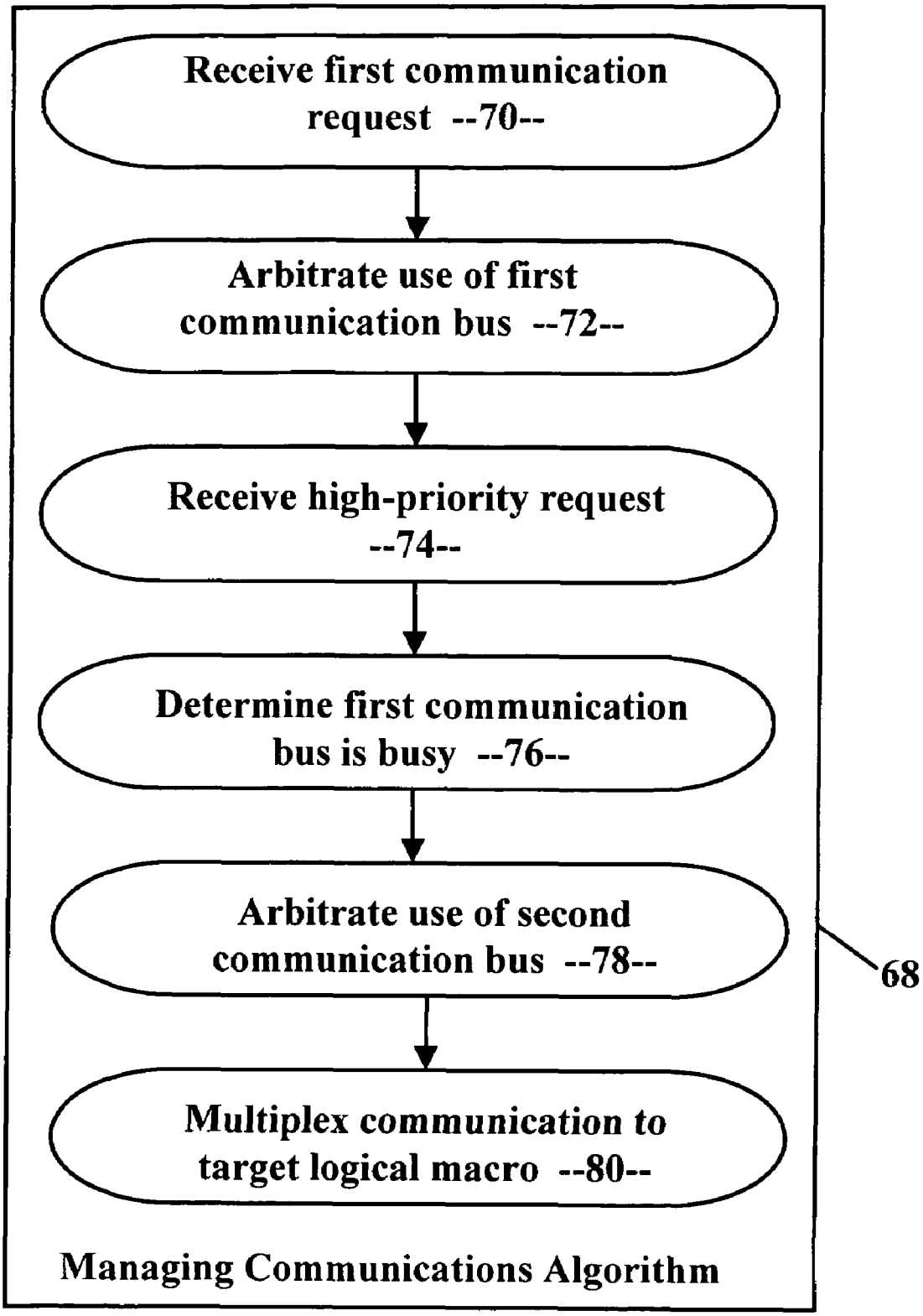
FIG. 4 is a flow-chart illustrating the process of managing communications between a plurality of source logical macros and one or more target logical macros utilizing a plurality of communication buses according to the invention.

FIG. 4 illustrates the algorithm 68 of managing communication between logical macros using a plurality of communication buses and associated arbiters. In step 70, a first communication arrives at a bus controller from a first source logical macro. In step 72, a first resource allocation algorithm assigns the first communication to a first communication bus. In step 74, a second communication arrives at the bus controller from a second source logical macro. In step 76, a second resource allocation algorithm determines that the first communication bus is busy and that the second communication is a high-priority message.

In step 78, the second resource allocation algorithm determines that the target logical macro of the second communication is different than the target logical macro of the first communication and assigns the second communication to a second communication bus. In step 80, the address of the target logical macro is compared to the target addresses of the first communication and the second communication and the result is used to multiplex the correct message to the target logical macro.

Those skilled in the art of making data communication systems may develop other embodiments of the present invention. For example, additional communication buses may be utilized as communication channels between the source logical macros 12 and the target logical macros 16, with each communication bus being associated with a different priority level. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A communication system, comprising:
    a first source logical macro adapted to transmit a first communication including a first target logical macro address and a first data message;
    a second source logical macro adapted to transmit a second communication including a second target logical macro address, a priority message, and a second data message; and
    a bus controller including a first communication bus, a second communication bus, a first arbiter implementing a first resource allocation algorithm, and a second arbiter implementing a second resource allocation algorithm;
    wherein the first resource allocation algorithm is adapted to place the first data message on the first communication bus; and, if the first communication bus is occupied by the first data message, the priority message meets a predetermined priority level, and the first target logical macro address is different from the second target logical macro address, the second resource allocation algorithm is adapted to place the second data message on the second communication bus.

2. The communication system of claim 1, wherein the bus controller further includes a first multiplexor and said first resource allocation algorithm is adapted to place the first data message on the first communication bus by directing said first multiplexor to complete a first communication path between said first source logical macro and said first communication bus.

3. The communication system of claim 2, wherein said second resource allocation algorithm is adapted to place the second data message on the second communication bus by directing said first multiplexor to complete a second communication path between said second source logical macro and said second communication bus.

4. The communication system of claim 1, further comprising a first target logical macro and said bus controller further includes a bus control interface adapted to write only either the first data message or the second data message to said first target logical macro.

5. The communication system of claim 4, wherein said bus control interface includes a second multiplexor that is directed by said first resource allocation algorithm and said second resource allocation algorithm to complete a third communication path between either the first communication bus and the first target logical macro or the second communication bus and the first target logical macro.

6. The communication system of claim 4, wherein said first communication includes an internal logical macro address and said bus control interface includes an address incrementer adapted to produce an incremented internal logical macro address.

7. The communication system of claim 6, wherein said first target logical macro includes a plurality of memory locations and said bus control interface writes the first data message to one of said plurality of memory locations as indicated by said incremented internal logical macro address.

8. A method of transmitting information from a first source logical-macro to a first target logical-macro, comprising the steps of:
    receiving a first communication request directed to said first target logical-macro;
    placing a first communication from said first source logical-macro on a first communication bus;
    receiving a second communication request directed to a second target logical-macro;
    placing a second communication from a second source logical-macro on a second communication bus; and
    multiplexing the first communication bus and the second communication to create a communication path between said first communication bus and said first target logical macro.

9. The method of claim 8, further comprising the step of transmitting a first internal logical macro address from said first source logical-macro to said first target logical-macro.

10. The method of claim 9, further comprising the step of utilizing the first internal logical macro address to determine to which of a plurality of memory locations within the first target logical-macro said first communication is written.

11. The method of claim 9, further comprising the step of incrementing the first internal logical macro address to determine to which of a plurality of memory locations within the first target logical-macro said first communication is written.

12. An article of manufacture including a data storage medium, said data storage medium including a set of machine-readable instructions that are executable by a processing device to implement an algorithm, said algorithm comprising the steps of:
    receiving a first communication request directed to a first target logical-macro;
    placing a first communication from a first source logical-macro on a first communication bus;
    receiving a second communication request directed to a second target logical-macro;
    placing a second communication from a second source logical-macro on a second communication bus; and
    multiplexing the first communication bus and the second communication to create a communication path between said first communication bus and said first target logical macro.

13. The article of manufacture of claim 12, further comprising the step of transmitting a first internal logical macro address from said first source logical-macro to said first target logical-macro.

14. The article of manufacture of claim 13, further comprising the step of utilizing the first internal logical macro address to determine to which of a plurality of memory locations within the first target logical-macro said first communication is written.

15. The article of manufacture of claim 13, further comprising the step of incrementing the first internal logical macro address to determine to which of a plurality of memory locations within the first target logical-macro said first communication is written.

* * * * *